(12) United States Patent
Arigaya et al.

(10) Patent No.: US 9,683,687 B2
(45) Date of Patent: Jun. 20, 2017

(54) SPHERICAL EXHAUST PIPE JOINT

(71) Applicant: OILES CORPORATION, Tokyo (JP)

(72) Inventors: Hideto Arigaya, Fujisawa (JP);
Hidetoshi Kaida, Fujisawa (JP);
Tsuyoshi Suematsu, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 310 days.

(21) Appl. No.: 14/411,746

(22) PCT Filed: May 20, 2013

(86) PCT No.: PCT/JP2013/003210
§ 371 (c)(1),
(2) Date: Dec. 29, 2014

(87) PCT Pub. No.: WO2014/006811
PCT Pub. Date: Jan. 9, 2014

(65) Prior Publication Data
US 2015/0198275 A1 Jul. 16, 2015

(30) Foreign Application Priority Data

Jul. 2, 2012 (JP) ................................ 2012-148954

(51) Int. Cl.
*F16L 27/04* (2006.01)
*F16L 21/04* (2006.01)
(Continued)

(52) U.S. Cl.
CPC .......... *F16L 21/04* (2013.01); *F01N 13/1811* (2013.01); *F01N 13/1827* (2013.01);
(Continued)

(58) Field of Classification Search
USPC .................... 285/261, 98, 95, 263, 267, 268
See application file for complete search history.

(56) References Cited

U.S. PATENT DOCUMENTS 1,434,631 A    11/1922   Reynolds
2,303,642 A * 12/1942   Hoy ........................ F16L 17/02
                                                               137/798
(Continued)

FOREIGN PATENT DOCUMENTS

CA    1 185 290     4/1985
JP    2-245593     10/1990
(Continued)

OTHER PUBLICATIONS

International Search Resort issued in PCT/JP2013/003210 dated Aug. 6, 2013.
(Continued)

*Primary Examiner* — Aaron Dunwoody
(74) *Attorney, Agent, or Firm* — Nixon & Vanderhye P.C.

(57) ABSTRACT

A spherical exhaust pipe joint 1 includes an outer case 6, an inner case 8, a seal body 13 facing an inner peripheral surface 9 of the outer case 6 and an outer peripheral surface 11 of the inner case 8, a seal body 16 facing the inner peripheral surface 9 of the outer case 6 and the outer peripheral surface 11 of the inner case 8, and a wave spring 17 which is disposed between the outer case 6 and the inner case 8 to resiliently urge the seal bodies 13 and 16 in an axial direction toward one of the outer case 6 and the inner case 8.

23 Claims, 7 Drawing Sheets

(51) Int. Cl.
*F16L 27/06* (2006.01)
*F01N 13/18* (2010.01)
*F16L 13/16* (2006.01)
*F16L 15/04* (2006.01)
*F16L 21/00* (2006.01)
*F16L 59/14* (2006.01)
*F16C 11/06* (2006.01)
*F01N 13/14* (2010.01)

(52) U.S. Cl.
CPC ..... *F01N 13/1844* (2013.01); *F01N 13/1888* (2013.01); *F16C 11/0676* (2013.01); *F16L 13/163* (2013.01); *F16L 15/04* (2013.01); *F16L 21/002* (2013.01); *F16L 27/04* (2013.01); *F16L 27/06* (2013.01); *F16L 59/14* (2013.01); *F01N 13/141* (2013.01); *F01N 13/143* (2013.01); *F01N 13/1855* (2013.01); *F01N 2450/16* (2013.01); *F01N 2450/22* (2013.01)

(56) References Cited

U.S. PATENT DOCUMENTS

| | | | | |
|---|---|---|---|---|
| 2,557,930 | A * | 6/1951 | Bard | F16L 27/042 285/267 |
| 3,396,992 | A * | 8/1968 | Hale | F16L 27/04 285/100 |
| 3,951,418 | A * | 4/1976 | Dryer | F16J 15/14 277/507 |
| 3,961,815 | A * | 6/1976 | Coulboy | E21B 17/085 285/267 |
| 4,012,060 | A * | 3/1977 | Reneau | F16L 27/06 285/267 |
| 4,408,785 | A * | 10/1983 | Legros | F16L 27/04 285/146.1 |
| 5,013,072 | A | 5/1991 | Roth | |
| 5,014,732 | A * | 5/1991 | Nitzberg | F16L 55/1015 137/614.04 |
| 5,735,553 | A * | 4/1998 | Niemiec | F16L 19/0212 285/101 |
| 5,971,439 | A * | 10/1999 | Cwik | F01N 13/1816 285/226 |
| 5,992,896 | A * | 11/1999 | Davey | F01N 13/1811 285/226 |
| 6,042,154 | A * | 3/2000 | Gensert | F01N 13/1811 285/233 |
| 6,572,154 | B1 * | 6/2003 | Niemiec | F16L 37/088 285/101 |
| 6,581,975 | B1 | 6/2003 | Holmoy | |
| 2004/0100096 | A1 * | 5/2004 | Atansoski | F01N 13/1816 285/299 |
| 2004/0140667 | A1 * | 7/2004 | Breay | F16L 5/025 285/189 |
| 2009/0242817 | A1 * | 10/2009 | Strazhgorodskiy | E21B 19/16 251/315.16 |
| 2009/0250548 | A1 * | 10/2009 | Nyhus | B64C 3/385 244/6 |
| 2010/0001512 | A1 * | 1/2010 | Breay | B64D 37/32 285/50 |

FOREIGN PATENT DOCUMENTS

| | | |
|---|---|---|
| JP | 02-245593 | 10/1990 |
| JP | 4-71898 U | 6/1992 |
| JP | 05-71338 | 3/1993 |
| JP | 5-47336 U | 6/1993 |
| JP | 06-323479 | 11/1994 |
| JP | 08-035424 | 2/1996 |
| JP | 8-35424 | 2/1996 |
| JP | 08-184395 | 7/1996 |
| JP | 08-210129 | 8/1996 |
| JP | 08-303666 | 11/1996 |
| JP | 2002-89259 | 3/2002 |
| JP | 2003-56341 | 2/2003 |
| JP | 2009-144885 | 7/2009 |
| JP | 2010-53975 | 3/2010 |
| WO | WO 00/39496 | 7/2000 |

OTHER PUBLICATIONS

Canadian Office Action issued in Application No. 2,875,191 dated Oct. 9, 2015.
Extended European Search Resort issued in Application No. 13813779.9 dated Jan. 4, 2016.
Japanese Office Action issued in Application No. 2012-148954 dated Feb. 9, 2016 (with partial translation).
International Search Report for PCT/JP2013/003210, mailed Aug. 6, 2013.
CD-ROM of the specification and drawings annexed to the request of JP Utility Model Application No. 109234/1991 (Laid-Open No. 047336/1993), (Oiles Corporation), Jun. 22, 1993).
Microfilm of the specification and drawings annexed to the request of JP Utility Model Application No. 112054/1990 (Laid-open No. 071898/1992), Kimmon Mfg. Co., Ltd., Jun. 25, 1992.

* cited by examiner

SPHERICAL EXHAUST PIPE JOINT

This application is the U.S. national phase of International Application No. PCT/JP2013/003210, filed 20 May 2013, which designated the U.S. and claims priority to JP Application No. 2012-148954, filed 2 Jul. 2012, the entire contents of each of which are hereby incorporated by reference.

TECHNICAL FIELD

The present invention relates to a spherical exhaust pipe joint for use in an exhaust pipe of a motor vehicle.

BACKGROUND ART

Exhaust gases from an automobile engine are led into an exhaust pipe disposed on such as a motor vehicle body (chassis) and are exhausted to the atmosphere, but this exhaust pipe is repeatedly subjected to bending stress owing to the torque reaction, inertial force, and the like of the engine. Accordingly, there are risks that the vibration of the engine can be transmitted through an exhaust pipe suspension into the vehicle compartment and cause noise, and can cause malfunctions such as the fatigue breakage of the exhaust pipe. To overcome such problems, in Patent Documents 1 to 7, for example, spherical exhaust pipe joints have been proposed which have relatively mutually rotatable inner and outer cases respectively having spherical surface portions that are in contact with each other directly or indirectly through a cushioning member so as to be slidable with each other, and a means has been adopted to absorb the stress by disposing such a spherical exhaust pipe joint at a predetermined portion of the exhaust pipe.

PRIOR ART DOCUMENTS

Patent Documents

Patent Document 1: JP-A-6-323479
Patent Document 2: JP-A-8-210129
Patent Document 3: JP-A-2-245593
Patent Document 4: JP-A-5-71338
Patent Document 5: JP-A-8-184395
Patent Document 6: JP-A-8-35424
Patent Document 7: JP-A-8-303666

SUMMARY OF THE INVENTION

Problems that the Invention is to Solve

Meanwhile, with such a spherical exhaust pipe joint, there is a possibility that if deterioration over time occurs to members such as the inner case, the outer case, the cushioning member, and the like due to the vibration of the motor vehicle body on the basis of the acceleration and deceleration of the motor vehicle, the rotation of the engine, and the like, gaps can be formed between the respective members and cause the respective members to collide against each other, thereby generating abnormal noise.

In addition, with such a spherical exhaust pipe joint, it is desirable to reduce the number of parts and make the spherical exhaust pipe joint compact in order to enlarge the degree of freedom of the mounting position with respect to the exhaust system after ensuring the isotropy of swinging motion including the mutual twisting direction of the upstream-side exhaust pipe and the downstream-side exhaust pipe.

The present invention has been devised in view of the above-described aspects, and its object is to provide a spherical exhaust pipe joint which is capable of eliminating possibilities of the collision between those members and the generation of abnormal noise without forming gaps between the respective members even if deterioration over time occurs to the respective members due to the vibration of the motor vehicle body on the basis of the acceleration and deceleration of the motor vehicle, the rotation of the engine, and the like, and which is capable of reducing the number of parts and making the spherical exhaust pipe joint compact after ensuring the isotropy of swinging motion including the mutual twisting direction of the upstream-side exhaust pipe and the downstream-side exhaust pipe, thereby attaining a reduction in cost and enlarging the degree of freedom of the mounting position with respect to the exhaust system.

Means for Solving the Problems

A spherical exhaust pipe joint in accordance with the present invention comprises: an outer case which is secured to a pipe end portion of one of an upstream-side exhaust pipe and a downstream-side exhaust pipe having a cylindrical pipe end portion disposed in such a manner as to oppose a pipe end portion of the upstream-side exhaust pipe; an inner case which is secured to a pipe end portion of another one of the upstream-side exhaust pipe and the downstream-side exhaust pipe, and which faces the outer case with a clearance therebetween in a radial direction; an annular first seal body which is disposed in the clearance on an upstream side and has an outer peripheral surface facing an inner peripheral surface of the outer case and an inner peripheral surface opposing that outer peripheral surface and facing an outer peripheral surface of the inner case; an annular second seal body which is disposed in the clearance on a downstream side of the first seal body and has an outer peripheral surface facing the inner peripheral surface of the outer case and an inner peripheral surface opposing that outer peripheral surface and facing the outer peripheral surface of the inner case; and a resiliently urging member which is disposed between the outer case and the inner case and resiliently urges the first seal body and the second seal body in an axial direction toward one of the outer case and the inner case, wherein in a case where the outer peripheral surface of the first seal body is shaped in a form of a convex spherical shape, a concave spherical seal seat facing a convex spherical outer peripheral surface of the first seal body is formed on the inner peripheral surface of the outer case, and in a case where the inner peripheral surface of the first seal body is shaped in a form of a concave spherical shape, a convex spherical seal seat facing a concave spherical inner peripheral surface of the first seal body is formed on the outer peripheral surface of the inner case, whereas in a case where the outer peripheral surface of the second seal body is shaped in a form of a convex spherical shape, a concave spherical seal seat facing a convex spherical outer peripheral surface of the second seal body is formed on the inner peripheral surface of the outer case, and in a case where the inner peripheral surface of the second seal body is shaped in a form of a concave spherical shape, a convex spherical seal seat facing a concave spherical inner peripheral surface of the second seal body is formed on the outer peripheral surface of the inner case.

According to the spherical exhaust pipe joint in accordance with the present invention, since there is particularly provided the resiliently urging member which is disposed between the outer case and the inner case and resiliently urges the first seal body and the second seal body in the axial direction toward one of the outer case and the inner case, even if deterioration over time occurs to the respective members due to the vibration of the motor vehicle body on the basis of the acceleration and deceleration of the motor vehicle, the rotation of the engine, and the like, it is possible to eliminate possibilities of collision between those members and the generation of abnormal noise without forming gaps between the respective members. Moreover, it is possible to ensure the isotropy of swinging motion including the mutual twisting direction of the upstream-side exhaust pipe and the downstream-side exhaust pipe. Further, it is possible to eliminate the need to install a connecting means consisting of, for instance, a bolt, a nut, a coil spring, and the like on the radially outer side of the outer case, which makes it possible to reduce the number of parts and make the spherical exhaust pipe joint compact, so that it is possible to attain a reduction in cost and enlarge the degree of freedom of the mounting position with respect to the exhaust system of the motor vehicle. Furthermore, according to the spherical exhaust pipe joint in accordance with the present invention, since the above-described configuration is provided, even if relative angular displacement and relative rotational displacement occur to the upstream-side exhaust pipe and the downstream-side exhaust pipe, the motor vehicle does not impart discomfort to the driver and the like and can be made quite comfortable to ride in without generating abnormal noise due to stick-slip and the like, the first seal body and the second seal body can be held in proper position without leakage of exhaust gases, and its manufacture can be facilitated.

According to the spherical exhaust pipe joint in accordance with the present invention, the resiliently urging member may be constituted by an annular wave spring (wave-shaped spring). In such a case, it is possible to make the overall length short in comparison with, for example, a general coil spring, and urging forces with respect to mating members coming into contact with the wave spring can be transmitted uniformly in the circumferential direction.

In the spherical exhaust pipe joint in accordance with the present invention, respective spherical centers of the convex spherical outer peripheral surface or the concave spherical inner peripheral surface of the first seal body and the convex spherical outer peripheral surface or the concave spherical inner peripheral surface of the second seal body may be identical or different.

In the spherical exhaust pipe joint in accordance with the present invention, the resiliently urging member may be interposed between the first seal body and the inner case to resiliently urge the first seal body in the axial direction toward the outer case; the resiliently urging member may be interposed between the second seal body and the inner case to resiliently urge the second seal body in the axial direction toward the outer case; the resiliently urging member may be interposed between the first seal body and the outer case in the axial direction to resiliently urge the first seal body in the axial direction toward the inner case; or the resiliently urging member may be interposed between the second seal body and the outer case in the axial direction to resiliently urge the second seal body in the axial direction toward the inner case.

In the spherical exhaust pipe joint in accordance with the present invention, the outer case may include a first outer case secured at its one axial end to the pipe end portion of the one exhaust pipe and a second outer case which is connected at its one axial end to another axial end of the first outer case and whose axial other end is disposed with a radial clearance with respect to the inner case or the other exhaust pipe. In such a case, it is possible to facilitate the assembly of the spherical exhaust pipe joint.

Threadedly engaging portions which are threadedly engaged with each other may be respectively formed on one of the outer peripheral surface or the inner peripheral surface of the other end of the first outer case and the inner peripheral surface and the outer peripheral surface of the one end of the second outer case. In such a case, the relative axial positions of the first outer case and the second outer case can be adjusted by making adjustment of the threaded engagement between the threadedly engaging portions in the assembly of the spherical exhaust pipe joint, thereby making it possible to adjust the preloading of the resiliently urging member in the axial direction. In addition, even if deterioration over time occurs to the first seal body and the second seal body and the like due to the use of the spherical exhaust pipe joint, the state of contact of the first seal body and the second seal body with respect to the seal seats and the gas seal by the first seal body and the second seal body can be maintained in a satisfactory state by readjusting the preloading.

The other end of the first outer case and the one end of the second outer case may be welded together.

The other end of the first outer case and the one end of the second outer case may be connected together by a bolt and a nut.

An annular collar portion may be formed at the other end of the first outer case, an annular collar portion which is located closer to a one end side of the first outer case in the axial direction than to the collar portion of the first outer case may be formed at the one end of the second outer case, the resiliently urging member may be interposed between the collar portion of the first outer case and the collar portion of the second outer case. In such a case, the resiliently urging member can be moved radially away from the upstream-side exhaust pipe and the downstream-side exhaust pipe serving as heat sources, and it is possible to obtain the resilient property of the resiliently urging member which is difficult to be affected by the temperature change of the heat sources.

In the spherical exhaust pipe joint in accordance with the present invention, a heat-insulating clearance may be formed between the inner case and the other exhaust pipe with the inner case secured thereto, and a heat insulating material may be interposed in the radial direction between the inner case and the other exhaust pipe with the inner case secured thereto. In such a case, it is possible to shut off the transmission of heat from the upstream-side exhaust pipe and the downstream-side exhaust pipe to the inner case, the first seal body, the second seal body, and the resiliently urging member, and the like, thereby making it possible to reduce deterioration due to heat at the respective members.

In the spherical exhaust pipe joint in accordance with the present invention, the first seal body and the second seal body may be bilaterally symmetrical about a line perpendicular to the axial direction.

In the spherical exhaust pipe joint in accordance with the present invention, the outer peripheral surfaces of the first seal body and the second seal body may be shaped in the form of the convex spherical shape, the concave spherical seal seats respectively facing the respective convex spherical outer peripheral surfaces of the first seal body and the second seal body may be formed on the inner peripheral surface of the outer case, and the concave spherical seal seat facing the convex spherical outer peripheral surface of the first seal body and the concave spherical seal seat facing the convex spherical outer peripheral surface of the second seal body may be bilaterally symmetrical about a line perpendicular to the axial direction.

In the spherical exhaust pipe joint in accordance with the present invention, the outer peripheral surface of at least one of the first seal body and the second seal body may be shaped in the form of the convex spherical shape, the concave spherical seal seat facing the convex spherical outer peripheral surface of the at least one of the first seal body and the second seal body may be formed on the inner peripheral surface of the outer case, and the convex spherical outer peripheral surface of the at least one of the first seal body and the second seal body may be formed such that a radius of curvature thereof becomes smaller than the radius of curvature of that concave spherical seal seat. In such a case, at least one of the first seal body and the second seal body is brought into line contact with the concave spherical seal seat of the outer case.

In the spherical exhaust pipe joint in accordance with the present invention, the convex spherical outer peripheral surfaces of the first seal body and the second seal body may be exposed surfaces of a lubricating sliding layer containing a solid lubricant. As the solid lubricant, it is possible to cite as preferred examples polytetrafluoroethylene resin, molybdenum disulfide, boron nitride, or the like.

The inner peripheral surfaces of the first seal body and the second seal body may be shaped in the form of the concave spherical shape, the convex spherical seal seats respectively facing the respective concave spherical inner peripheral surfaces of the first seal body and the second seal body may be formed on the outer peripheral surface of the inner case, and the convex spherical seal seat facing the concave spherical inner peripheral surface of the first seal body and the convex spherical seal seat facing the concave spherical inner peripheral surface of the second seal body may be bilaterally symmetrical about a line perpendicular to the axial direction.

In the spherical exhaust pipe joint in accordance with the present invention, the inner peripheral surface of at least one of the first seal body and the second seal body may be shaped in the form of the concave spherical shape, the convex spherical seal seat facing the concave spherical inner peripheral surface of the at least one of the first seal body and the second seal body may be formed on the outer peripheral surface of the inner case, and the concave spherical inner peripheral surface of the at least one of the first seal body and the second seal body may be formed such that a radius of curvature thereof becomes greater than the radius of curvature of that convex spherical seal seat. In such a case, at least one of the first seal body and the second seal body is brought into line contact with the convex spherical seal seat of the inner case.

In the spherical exhaust pipe joint in accordance with the present invention, the concave spherical inner peripheral surfaces of the first seal body and the second seal body may be exposed surfaces of a lubricating sliding layer containing a solid lubricant. As the solid lubricant, it is possible to cite as preferred examples polytetrafluoroethylene resin, molybdenum disulfide, boron nitride, or the like.

In the spherical exhaust pipe joint in accordance with the present invention, the first seal body and the second seal body may be formed by the compression molding of a heat insulating material, such as expanded graphite, mica, asbestos, or the like, and a reinforcing member made from a metal wire net formed from a fine metal wire, such that the heat insulating material is disposed in gaps of the reinforcing member made from the metal wire net.

Advantages of the Invention

According to the present invention, it is possible to provide a spherical exhaust pipe joint which is capable of eliminating possibilities of the collision between those members and the generation of abnormal noise without forming gaps between the respective members even if deterioration over time occurs to the respective members due to the vibration of the motor vehicle body on the basis of the acceleration and deceleration of the motor vehicle, the rotation of the engine, and the like, and which is capable of reducing the number of parts and making the spherical exhaust pipe joint compact after ensuring the isotropy of swinging motion including the mutual twisting direction of the upstream-side exhaust pipe and the downstream-side exhaust pipe, thereby attaining a reduction in cost and enlarging the degree of freedom of the mounting position with respect to the exhaust system.

BRIEF DESCRIPTION OF THE DRAWINGS

Parts (a) and (b) of FIG. 5 are explanatory partial views of the outer case in the embodiment shown in FIG. 1.

MODE FOR CARRYING OUT THE INVENTION

Next, a more detailed description will be given of a mode for carrying out the invention with reference to the preferred embodiments illustrated in the drawings. It should be noted that the invention is not limited to these embodiments.

Figure 1:
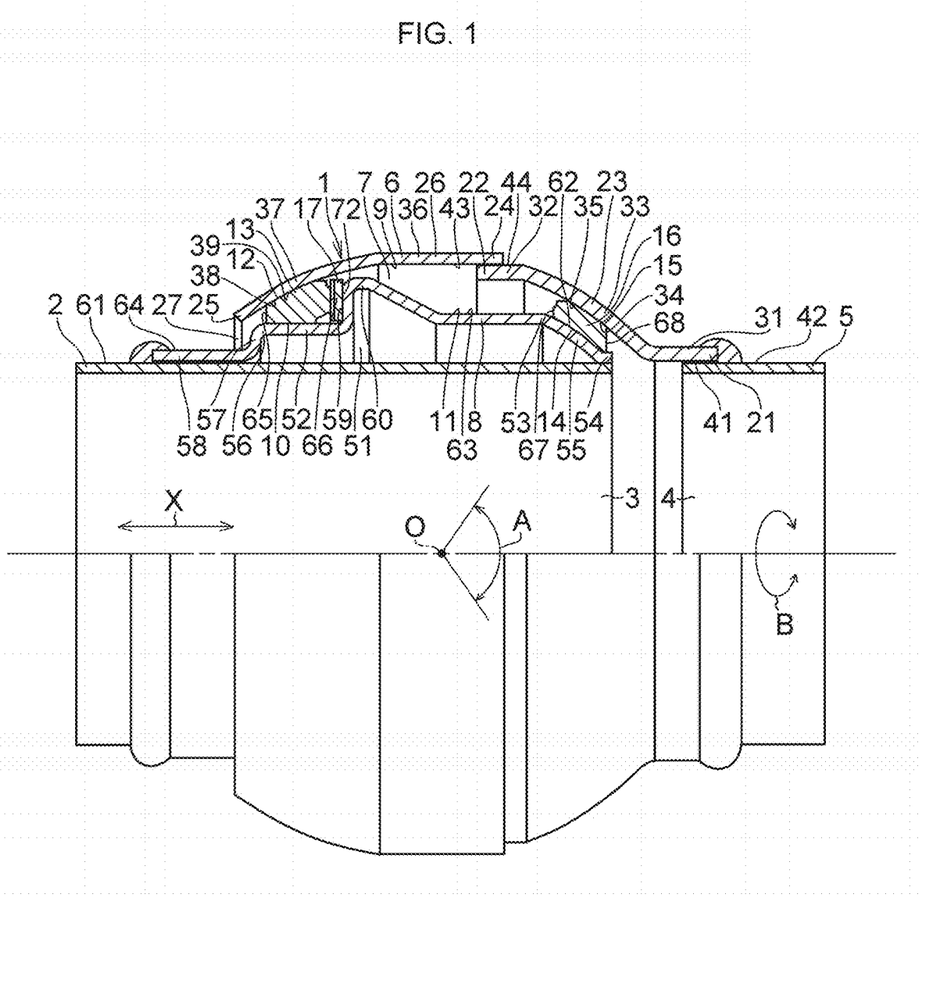
FIG. 1 is an explanatory partial vertical cross-sectional view of an embodiment of the invention.
Figure 2:
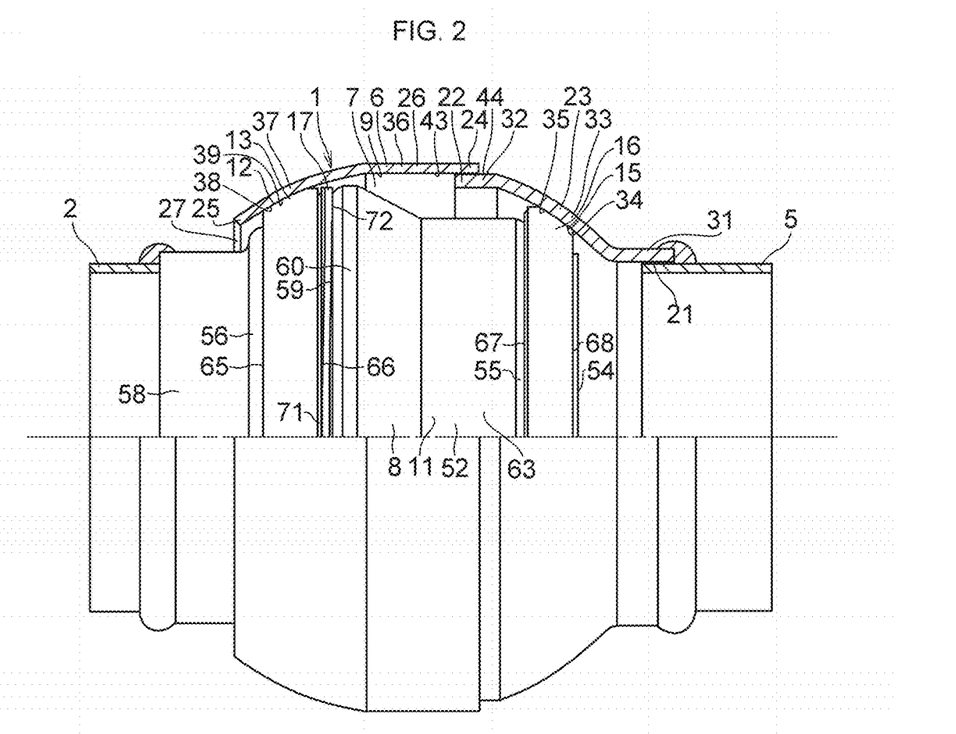
FIG. 2 is an explanatory fragmentary view of an outer case in the embodiment shown in FIG. 1.
Figure 3:
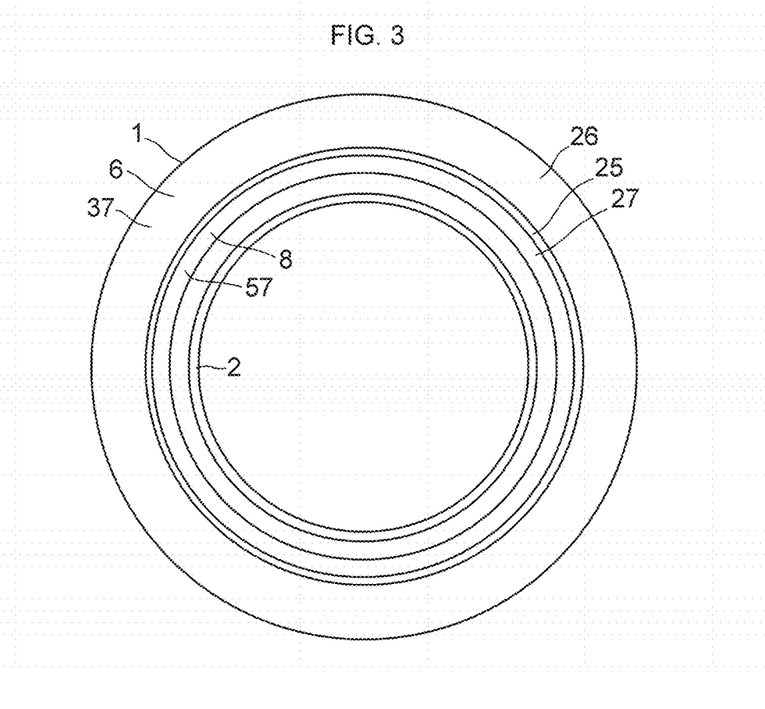
FIG. 3 is an explanatory view, taken from the upstream side, of the embodiment shown in FIG. 1.

In FIGS. 1 to 3, a spherical exhaust pipe joint 1 in accordance with this embodiment is comprised of an outer case 6 which is secured to a pipe end portion of one of an upstream-side exhaust pipe 2 connected to the engine side and a downstream-side exhaust pipe 5 connected to the atmosphere side and having a cylindrical pipe end portion 4 disposed in such a manner as to oppose a cylindrical pipe end portion 3 of the upstream-side exhaust pipe 2 with an interval therebetween in an X direction, i.e., an axial direction, the outer case 6 being secured to the pipe end portion 4 of the downstream-side exhaust pipe 5 in this embodiment; an inner case 8 which is secured to the pipe end portion of the other one of the upstream-side exhaust pipe 2 and the downstream-side exhaust pipe 5, i.e., to the pipe end portion 3 of the upstream-side exhaust pipe 2 in this embodiment, and which faces the outer case 6 with a clearance 7 therebetween in a radial direction; an annular seal body 13 which is disposed in the clearance 7 on an upstream side and has an outer peripheral surface 12 facing an inner peripheral surface 9 of the outer case 6 and an inner peripheral surface 10 opposing the outer peripheral surface 12 and facing an outer peripheral surface 11 of the inner case 8; an annular seal body 16 which is disposed in the clearance 7 on a downstream side of the seal body 13 and has an outer peripheral surface 15 facing the inner peripheral surface 9 of the outer case 6 and an inner peripheral surface 14 opposing the outer peripheral surface 15 and facing the outer peripheral surface 11 of the inner case 8; and an annular wave spring (wave-shaped spring) 17 serving as a resiliently urging member which is disposed between the outer case 6 and the inner case 8 and resiliently urges the seal bodies 13 and 16 in the X direction toward one of the outer case 6 and the inner case 8, i.e., the outer case 6 in this embodiment.

The outer case 6 includes a first outer case 23 (hereafter referred to as the outer case 23) secured at its end portion (one end) 21 in the X direction to the pipe end portion 4 of the downstream-side exhaust pipe 5 and a second outer case 26 (hereafter referred to as the outer case 26) which is connected at its end portion (one end) 24 in the X direction to an end portion (other end) 22 in the X direction of the outer case 23 and whose end portion (other end) 25 in the X direction is disposed with a radial clearance 27 with respect to the inner case 8.

The outer case 23 includes a small-diameter cylindrical portion 31 secured at the end portion 21 to the pipe end portion 4 of the downstream-side exhaust pipe 5 by welding or the like, a large-diameter cylindrical portion 32 disposed upstream of the small-diameter cylindrical portion 31, and a partially spherical portion 33 disposed between the small-diameter cylindrical portion 31 and the large-diameter cylindrical portion 32 in the X direction and integrally connected to the small-diameter cylindrical portion 31 and the large-diameter cylindrical portion 32, and a concave spherical seal seat 35 facing the convex spherical outer peripheral surface 15 of the seal body 16 is formed on an inner peripheral surface 34 of the partially spherical portion 33. The small-diameter cylindrical portion 31 is joined at its inner peripheral surface 41 to an outer peripheral surface 42 of the pipe end portion 4 of the downstream-side exhaust pipe 5 and is secured thereto by welding or the like. The seal seat 35 has a shape complementary to the convex spherical outer peripheral surface 15 of the seal body 16.

The outer case 26 includes a large-diameter cylindrical portion 36 connected at the end portion 24 to the end portion 22 of the large-diameter cylindrical portion 32 of the outer case 23 by laser welding and a partially spherical portion 37 disposed upstream of the large-diameter cylindrical portion 36 and integrally connected to that large-diameter cylindrical portion 36, and a concave spherical seal seat 39 facing the convex spherical outer peripheral surface 12 of the seal body 13 is formed on an inner peripheral surface 38 of the partially spherical portion 37. The large-diameter cylindrical portion 36 is joined at its inner peripheral surface 43 to an outer peripheral surface 44 of the large-diameter cylindrical portion 32 of the outer case 23 and is secured thereto by laser welding. The seal seat 39 in this embodiment has a shape complementary to the convex spherical outer peripheral surface 12 of the seal body 13. The seal seats 35 and 39 have a mutually identical spherical center O.

Figure 5:
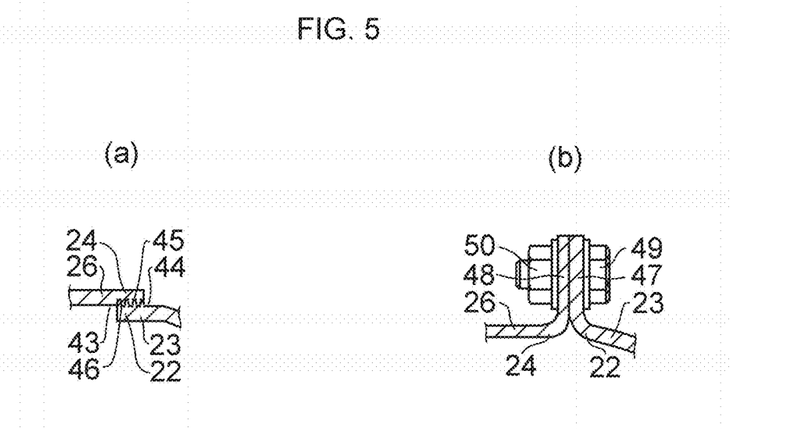

The outer cases 23 and 26 in this embodiment are connected by laser welding; however, as shown in the part (a) of FIG. 5, threadedly engaging portions 45 and 46 which are respectively threadedly engaged with each other may alternatively be formed on the outer peripheral surface 44 at the end portion 22 of the large-diameter cylindrical portion 32 and the inner peripheral surface 43 at the end portion 24 of the large-diameter cylindrical portion 36, and one of the threadedly engaging portions 45 and 46 may be constituted by an external thread, while the other one may be constituted by an internal thread. In such a case, the relative position of the outer case 26 with respect to the outer case 23 in the X direction can be adjusted by making adjustment of the threaded engagement between the threadedly engaging portions 45 and 46 in the assembly of the spherical exhaust pipe joint 1, thereby making it possible to simply adjust the preloading of the wave spring in the X direction. In addition, even if deterioration over time occurs to the seal bodies 13 and 16 and the like due to the use of the spherical exhaust pipe joint 1, the state of contact of the seal bodies 13 and 16 with respect to the seal seats 35 and 39 and the gas seal by the seal bodies 13 and 16 can be maintained in a satisfactory state by readjusting the preloading of the wave spring through the aforementioned adjustment of threaded engagement. It should be noted that, in a case where readjustment of the preloading of the wave spring is not carried out through the aforementioned adjustment of threaded engagement, the end portion 22 of the outer case 23 and the end portion 24 of the outer case 26 may be secured by welding or the like after making initial adjustment of threaded engagement of the threadedly engaging portions 45 and 46 in the assembly of the spherical exhaust pipe joint 1.

Furthermore, although the outer cases 23 and 26 in this embodiment are connected by laser welding, flanges 47 and 48 may alternatively be formed respectively at the end portion 22 of the outer case 23 and the end portion 24 of the outer case 26, and the flanges 47 and 48 may be fastened together by a bolt 49 and a nut 50 to thereby connect the outer cases 23 and 26, as shown in the part (b) of FIG. 5.

The inner case 8 includes a cylindrical portion 52 which faces the outer case 6 with the radial clearance 7 and faces the upstream-side exhaust pipe 2 with a radial heat-insulating clearance 51; a tapered cylindrical portion 55 which is located downstream of a downstream end 53 of the cylindrical portion 52, has a cylindrical small-diameter end portion 54 secured to an outer peripheral surface 61 at the pipe end portion 3 of the upstream-side exhaust pipe 2 by welding or the like, and integrally connects the one end 53 of the cylindrical portion 52 and the small-diameter end portion 54; a small-diameter cylindrical portion 58 which is integrally connected to an upstream other end 56 of the cylindrical portion 52 via an annular connecting portion 57 extending radially inwardly from that other end 56, and is secured to an outer peripheral surface 61 of the upstream-side exhaust pipe 2 by welding or the like; and an annular projecting portion 60 which is disposed at an intermediate portion of the cylindrical portion 52 located away from the one end 53 and the other end 56 in the X direction and is formed in such a manner as to project radially outwardly, and which has an annular abutment surface 59 for abutting against the wave spring 17. An outer peripheral surface 62 of the tapered cylindrical portion 55 which is gradually reduced in diameter from the upstream side toward the downstream side may be flat or may have a convex spherical shape. The annular projecting portion 60 is gradually reduced in diameter in tapered form from the upstream side toward the downstream side. The abutment surface 59 is parallel with a plane perpendicular to the X direction. The inner peripheral surface 10 of the seal body 13 abuts against an outer peripheral surface 63 of the cylindrical portion 52 located between the annular connecting portion 57 and the abutment surface 59 in the X direction.

The cylindrical portion 52, the tapered cylindrical portion 55, and the annular projecting portion 60 are disposed with the radial clearance 7 with respect to the outer case 6, and is disposed with the radial heat-insulating clearance 51 with respect to the outer peripheral surface 61 of the upstream-side exhaust pipe 2, and an outer peripheral surface 64 of the small-diameter cylindrical portion 58 is disposed with the radial clearance 27 with respect to the end portion 25 of the outer case 26.

The seal bodies 13 and 16 are formed by the compression molding of a heat insulating material, such as expanded graphite, mica, asbestos, or the like, i.e., a heat insulating material formed principally of expanded graphite in this embodiment, and a reinforcing member made from a metal wire net formed from a fine metal wire, such that the heat insulating material is disposed in gaps of the reinforcing member made from the metal wire net.

The spherical annular seal body 13 in this embodiment has the aforementioned convex spherical outer peripheral surface 12 which is slidable with and is in gas-tight contact with the concave spherical seal seat 39 of the outer case 26 and is constituted by an exposed surface of a lubricating sliding layer containing a solid lubricant, the aforementioned inner peripheral surface 10 which has a shape complementary to the outer peripheral surface 63 of the cylindrical portion 52 and is in contact with that outer peripheral surface 63, and a pair of annular end faces 65 and 66 opposing each other in the X direction. The upstream-side annular end face 65 is smaller in diameter than the downstream-side annular end face 66. The annular end face 66 abuts against the wave spring 17 and faces the abutment surface 59 with the wave spring 17 interposed therebetween in the X direction.

The spherical annular seal body 16 in this embodiment has the aforementioned convex spherical outer peripheral surface 15 which is slidable with and is in gas-tight contact with the concave spherical seal seat 35 of the outer case 23 and is constituted by an exposed surface of a lubricating sliding layer containing a solid lubricant, the aforementioned inner peripheral surface 14 which has a shape complementary to the outer peripheral surface 62 of the tapered cylindrical portion 55 and is in contact with that outer peripheral surface 62, and a pair of annular end faces 67 and 68 opposing each other in the X direction. The respective spherical center O of the outer peripheral surface 12 of the seal body 13 and the outer peripheral surface 15 of the seal body 16 is identical.

Figure 4:
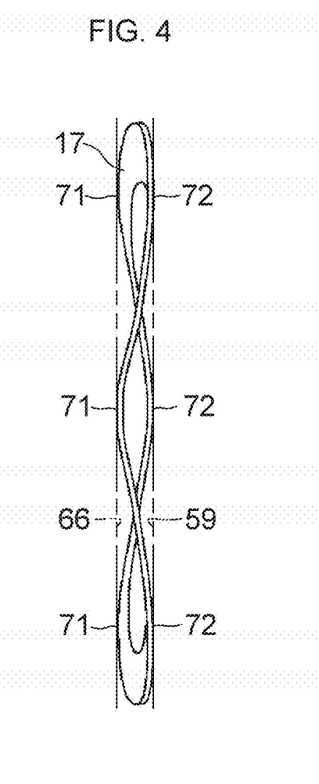
FIG. 4 is an explanatory view of mainly a wave spring in the embodiment shown in FIG. 1.

As shown in FIG. 4, the wave spring 17 is formed in waveform in the circumferential direction. Such a wave spring 17 in this embodiment is interposed between the annular end face 66 of the seal body 13 and the abutment surface 59 of the inner case 8 in the X direction, resiliently urges the outer peripheral surface 12 of the seal body 13 toward the seal seat 39 of the outer case 26 in the X direction, and resiliently urges the outer peripheral surface 15 of the seal body 16 toward the seal seat 35 of the outer case 23 in the X direction through the seal body 13 and the outer case 26. In the wave spring 17, a plurality of abutment portions 71 abutting against the annular end face 66 of the seal body 13 are arranged at equal intervals in the circumferential direction, and a plurality of abutment portions 72 abutting against the abutment surface 59 of the inner case 8 are arranged at equal intervals in the circumferential direction. Thus, it is possible to uniformly transmit resiliently urging forces to the annular end face 66 and the abutment surface 59 in the circumferential direction through the pluralities of abutment portions 71 and 72, and both of these urging forces are identical, so that the state of contact between the seal body 13 and the outer case 26 and the state of contact between the seal body 16 and the outer case 23 can be maintained satisfactorily by the urging described above. Further, since the length of such a wave spring 17 in the expanding and contracting direction is formed to be short in comparison with, for instance, a coil spring, it is possible to make the dimension of the spherical exhaust pipe joint 1 in the X direction short, and since the wave spring 17 itself is disposed in the clearance 7 between the outer case 6 and the inner case 8, the radial dimension of the spherical exhaust pipe joint 1 can be made small.

With the above-described spherical exhaust pipe joint 1, the relative swinging motion in a direction A of angular displacement between the upstream-side exhaust pipe 2 and the downstream-side exhaust pipe 5 as well as the relative swinging motion in a twisting direction (rotating direction) B between the upstream-side exhaust pipe 2 and the downstream-side exhaust pipe 5 are allowed with isotropy by the sliding between the seal seat 35 of the outer case 23 and the outer peripheral surface 15 of the seal body 16 and by the sliding between the seal seat 39 of the outer case 26 and the outer peripheral surface 12 of the seal body 13.

Here, even if deterioration over time occurs to such as the outer peripheral surfaces 12 and 15 of the seal bodies 13 and 16 owing to such as the repetition of the sliding between the seal seat 35 of the outer case 23 and the outer peripheral surface 15 of the seal body 16 and the sliding between the seal seat 39 of the outer case 26 and the outer peripheral surface 12 of the seal body 13, the state of contact between the seal seat 35 of the outer case 23 and the outer peripheral surface 15 of the seal body 16 and the state of contact between the seal seat 39 of the outer case 26 and the outer peripheral surface 12 of the seal body 13 are maintained satisfactorily by virtue of the resiliently urging forces of the wave spring 17.

According to the spherical exhaust pipe joint 1 in accordance with this embodiment, the spherical exhaust pipe joint 1 is comprised of the outer case 6 which is secured to the pipe end portion 4 of the downstream-side exhaust pipe 5 serving as one of the upstream-side exhaust pipe 2 and the downstream-side exhaust pipe 5 having the pipe end portion 4 disposed in such a manner as to oppose the pipe end portion 3 of the upstream-side exhaust pipe 2; the inner case 8 which is secured to the pipe end portion 3 of the upstream-side exhaust pipe 2 serving as the other one of the upstream-side exhaust pipe 2 and the downstream-side exhaust pipe 5, and which faces the outer case 6 with the clearance 7 therebetween in the radial direction; the annular seal body 13 which is disposed in the aforementioned clearance 7 on the upstream side and has the outer peripheral surface 12 facing the inner peripheral surface 9 of the outer case 6 and the inner peripheral surface 10 opposing the outer peripheral surface 12 and facing the outer peripheral surface 11 of the inner case 8; the annular seal body 16 which is disposed in the aforementioned clearance 7 on the downstream side of the seal body 13 and has the outer peripheral surface 15 facing the inner peripheral surface 9 of the outer case 6 and the inner peripheral surface 14 opposing the outer peripheral surface 15 and facing the outer peripheral surface 11 of the inner case 8; and the wave spring 17 serving as a resiliently urging member which is disposed between the outer case 6 and the inner case 8 and resiliently urges the seal bodies 13 and 16 in the X direction toward one of the outer case 6 and the inner case 8. The outer peripheral surface 12 of the seal body 13 has a convex spherical shape, and the concave spherical seal seat 39 facing that outer peripheral surface 12 is formed on the inner peripheral surface 9 of the outer case 6, while the outer peripheral surface 15 of the seal body 16 has a convex spherical shape, and the concave spherical seal seat 35 facing that outer peripheral surface 15 is formed on the inner peripheral surface 9 of the outer case 6. Therefore, even if deterioration over time occurs to the respective members due to the vibration of the motor vehicle body on the basis of the acceleration and deceleration of the motor vehicle, the rotation of the engine, and the like, it is possible to eliminate possibilities of collision between those members and the generation of abnormal noise without forming gaps between the respective members. Moreover, it is possible to ensure the isotropy of swinging motion including the mutual twisting direction of the upstream-side exhaust pipe 2 and the downstream-side exhaust pipe 5. Further, it is possible to eliminate the need to install a connecting means (not shown) consisting of, for instance, a bolt, a nut, a coil spring, and the like on the radially outer side of the outer case 6, which makes it possible to reduce the number of parts and make the spherical exhaust pipe joint compact, so that it is possible to attain a reduction in cost and enlarge the degree of freedom of the mounting position with respect to the exhaust system of the motor vehicle. Furthermore, according to the spherical exhaust pipe joint 1, since the above-described configuration is provided, even if relative angular displacement and relative rotational displacement occur to the upstream-side exhaust pipe 2 and the downstream-side exhaust pipe 5, the motor vehicle does not impart discomfort to the driver and the like and can be made quite comfortable to ride in without generating abnormal noise due to stick-slip and the like, the seal bodies 13 and 16 can be held in proper position without leakage of exhaust gases, and its manufacture can be facilitated.

According to the spherical exhaust pipe joint 1, since the resiliently urging member is constituted by the annular wave spring 17, it is possible to make the overall length short in comparison with, for example, a general coil spring, and the urging forces with respect to mating members coming into contact with the wave spring 17 can be transmitted uniformly in the circumferential direction.

According to the spherical exhaust pipe joint 1, since the outer case 6 includes the outer case 23 secured at its end portion 21 in the X direction to the pipe end portion 4 of the downstream-side exhaust pipe 5 and the outer case 26 which is connected at its end portion 24 in the X direction to the end portion 22 in the X direction of the outer case 23 and whose end portion 25 in the X direction is disposed with the radial clearance 27 with respect to the inner case 8 or the upstream-side exhaust pipe 2, it is possible to facilitate the assembly of the spherical exhaust pipe joint 1.

According to the spherical exhaust pipe joint 1, since the heat-insulating clearance 51 is formed between the inner case 8 and the upstream-side exhaust pipe 2 to which that inner case 8 is secured, it is possible to shut off the transmission of heat from the upstream-side exhaust pipe 2 and the downstream-side exhaust pipe 5 to the inner case 8, the seal body 13, the seal body 16, the wave spring 17, and the like, thereby making it possible to reduce deterioration due to heat at the respective members.

In the above-described spherical exhaust pipe joint 1, at least one of the outer peripheral surfaces 12 and 15 of the seal bodies 13 and 16, for example, may be formed such that its radius of curvature becomes smaller than the radius of curvature of at least a corresponding one of the seal seats 35 and 39.

Figure 6:
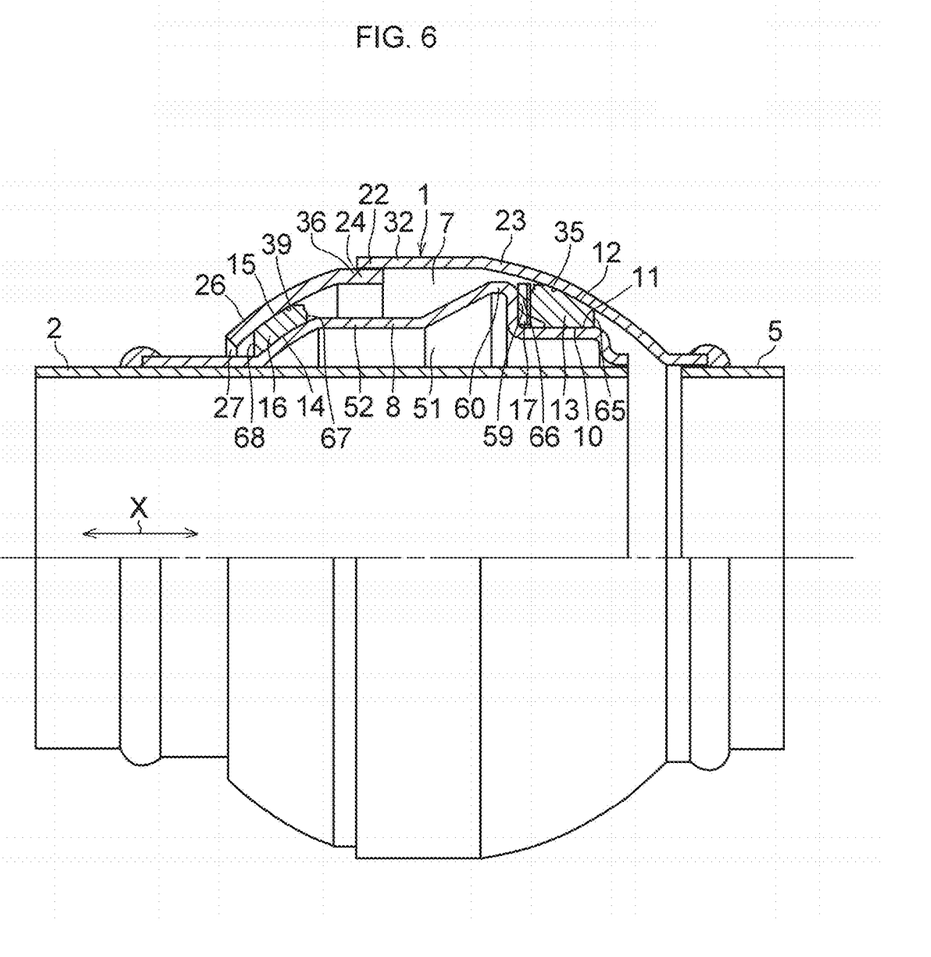
FIG. 6 is an explanatory partial vertical cross-sectional view of another embodiment of the invention.

Although the spherical exhaust pipe joint 1 in accordance with the present invention is configured as mainly shown in FIGS. 1 to 3, the spherical exhaust pipe joint 1 may alternatively be configured as shown in FIG. 6, for example. In the spherical exhaust pipe joint 1 shown in FIG. 6, the configuration is identical to that of the spherical exhaust pipe joint 1 shown in FIGS. 1 to 3, excluding the configuration described below. Namely, the large-diameter cylindrical portion 32 of the outer case 23 is formed so as to be located radially outwardly of the large-diameter cylindrical portion 36 of the outer case 26; the inner case 8 is formed with its cylindrical portion 52 and annular projecting portion 60 oriented inversely in the X direction, and the seal bodies 13 and 16 are also arranged in inverse orientation in the X direction, such that the outer peripheral surface 12 of the seal body 13 is in slidable contact with the seal seat 35 of the outer case 23, and the outer peripheral surface 15 of the seal body 16 is in slidable contact with the seal seat 39 of the outer case 26; and the wave spring 17 is interposed between the seal body 13 and the inner case 8. In such a case, respective shapes of the outer peripheral surface 12 of the seal body 13 and the seal seat 35 of the outer case 23 are formed so as to come into slidable contact with each other gas-tightly, and respective shapes of the outer peripheral surface 15 of the seal body 16 and the seal seat 39 of the outer case 26 are formed so as to come into slidable contact with each other gas-tightly.

Figure 7:
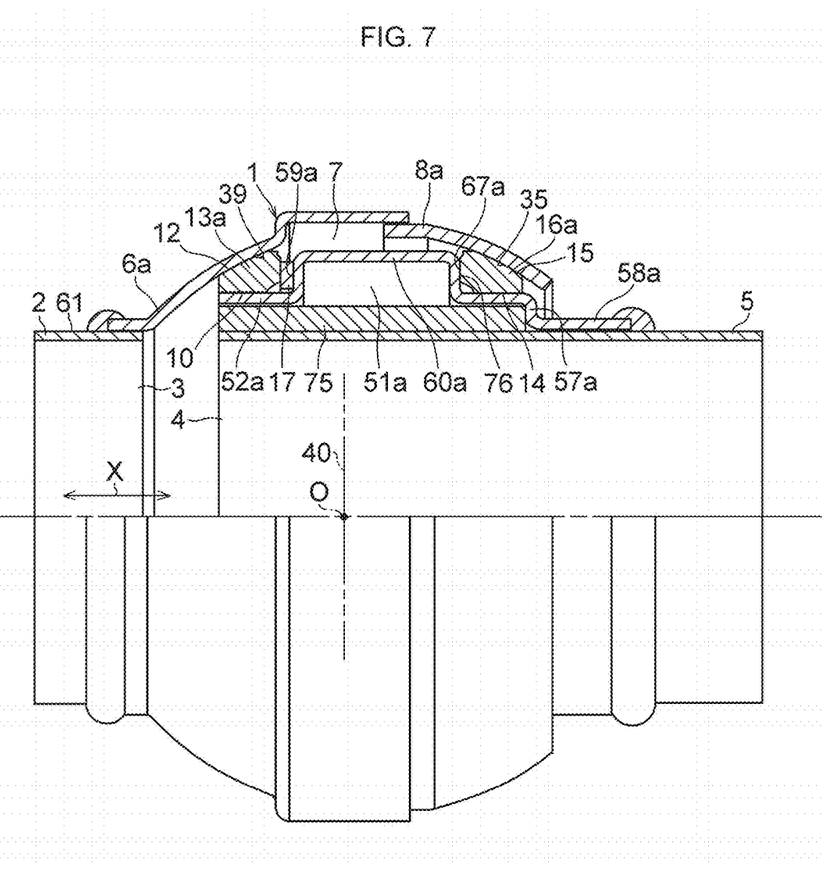
FIG. 7 is an explanatory partial vertical cross-sectional view of still another embodiment of the invention.

Although the spherical exhaust pipe joint 1 is configured as mainly shown in FIGS. 1 to 3, the spherical exhaust pipe joint 1 may alternatively be configured as shown in FIG. 7, for example. In the spherical exhaust pipe joint 1 shown in FIG. 7, the configuration is identical to that of the spherical exhaust pipe joint 1 shown in FIGS. 1 to 3, excluding the configuration described below. Namely, an outer case 6a is secured to the pipe end portion 3 of the upstream-side exhaust pipe 2; an inner case 8a is secured to the pipe end portion 4 of the downstream-side exhaust pipe 5; seal bodies 13a and 16a are formed in a spherical annular shape, have an identical spherical center O, and are formed bilaterally symmetrically about a line 40 extending in a direction perpendicular to the X direction and passing through the spherical center O; and a heat insulating material 75 is interposed between the inner case 8a and the downstream-side exhaust pipe 2. The inner case 8a includes a small-diameter cylindrical portion 58a secured to the downstream-side exhaust pipe 5 by welding or the like; a cylindrical portion 52a which is disposed with the clearance 7 with respect to the outer case 6a, is disposed with a heat-insulating clearance 51a where the heat insulating material 75 is interposed with respect to the downstream-side exhaust pipe 5, and is integrally connected to the small-diameter cylindrical portion 58a through an annular connecting portion 57a; and an annular projecting portion 60a which is disposed at an intermediate portion located away from both ends of the cylindrical portion 52a in the X direction and is formed in such a manner as to project radially outwardly. The annular projecting portion 60a has an abutment surface 59a for abutting against the wave spring 17 and an annular abutment surface 76 against which an annular end face 67a of the seal body 16a abuts. The heat insulating material 75 made from silica or the like is cylindrical in shape, is fitted over the outer peripheral surface 61 of the downstream-side exhaust pipe 2, and its portions are disposed between the seal body 13a and the downstream-side exhaust pipe 2 and between the seal body 16a and the downstream-side exhaust pipe 2 in the radial direction. In the spherical exhaust pipe joint 1 shown in FIG. 7, the wave spring 17 may be interposed between the abutment surface 76 of the annular projecting portion 60a and the annular end face 67a of the seal body 16a, and, in addition to the above-described wave spring 17, another wave spring configured in the same way as the wave spring 17 may be interposed between the abutment surface 76 of the annular projecting portion 60a and the annular end face 67a of the seal body 16a. In the spherical exhaust pipe joint 1 shown in FIG. 7, since the heat insulating material 75 is provided, it is possible to shut off the transmission of heat from the upstream-side exhaust pipe 2 and the downstream-side exhaust pipe 5 to the inner case 8a, the seal body 13a, the seal body 16a, the wave spring 17, and the like, thereby making it possible to reduce deterioration due to heat at the respective members.

Figure 8:
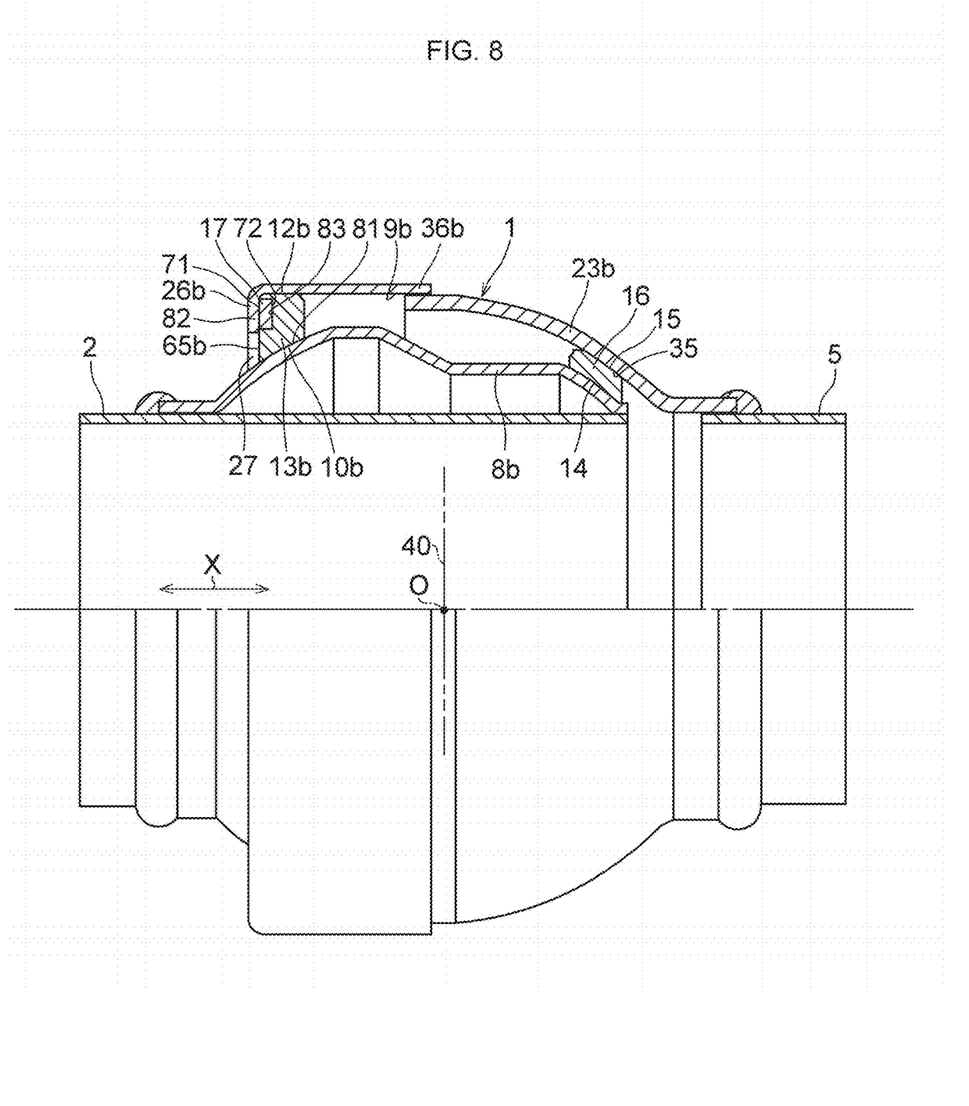
FIG. 8 is an explanatory partial vertical cross-sectional view of a further embodiment of the invention.

Although the spherical exhaust pipe joint 1 is configured as mainly shown in FIGS. 1 to 3, the spherical exhaust pipe joint 1 may alternatively be configured as shown in FIG. 8, for example. In the spherical exhaust pipe joint 1 shown in FIG. 8, the configuration is identical to that of the spherical exhaust pipe joint 1 shown in FIGS. 1 to 3, excluding the configuration described below. Namely, a seal body 13b has its inner peripheral surface 10b formed in a concave spherical shape, and an annular concave portion 83 in which the wave spring 17 is disposed is formed at an upstream-side annular end face 65b; an inner case 8b has a convex spherical seal seat 81 which faces the inner peripheral surface 10b and is in slidable contact with that inner peripheral surface 10b; and an outer case 26b includes a large-diameter cylindrical portion 36b having an inner peripheral surface 9b facing an outer peripheral surface 12b of the seal body 13b, as well as an annular end portion 82 which is integrally connected to an upstream-side end portion of the large-diameter cylindrical portion 36b, is disposed with the radial clearance 27 with respect to the inner case 8b, and extends radially inwardly so as to abut against the wave spring 17. The annular end portion 82 also abuts against the annular end face 65b of the seal body 13b to shut off the interior of the spherical exhaust pipe joint 1 from the outside air. Here, the wave spring 17 has its abutment portion 71 abutting against the annular end portion 82 and its abutment portion 72 abutting against the bottom surface of the annular concave portion 83, so as to resiliently urge the seal body 13b in the X direction toward the inner case 8b. Thus, the spherical exhaust pipe joint 1 may include the seal body having the concave spherical inner peripheral surface, as well as the inner case having the convex spherical seal seat facing that inner peripheral surface, and, instead of the seal body 16 and the seal seat 35 shown in FIG. 8, may include a seal body having a concave spherical inner peripheral surface, as well as a convex spherical seal seat facing that inner peripheral surface. In such a case, the wave spring 17 may be interposed between an outer case 23b and the aforementioned seal body, and the wave spring 17 may be adapted to resiliently urge that seal body in the X direction toward the seal seat. Furthermore, the concave spherical inner peripheral surface of the aforementioned seal body and the aforementioned convex spherical seal seat facing that inner peripheral surface, as well as the inner peripheral surface 10b of the seal body 13b and the seal seat 81 facing that inner peripheral surface 10b, may be bilaterally symmetrical about the line 40. Still further, the concave spherical inner peripheral surfaces of both seal bodies may be exposed surfaces of a lubricating sliding layer containing a solid lubricant. In addition, the concave spherical inner peripheral surface of the aforementioned seal body may be formed such that its radius of curvature becomes greater than the radius of curvature of the convex spherical seal seat of the aforementioned inner case.

Figure 9:
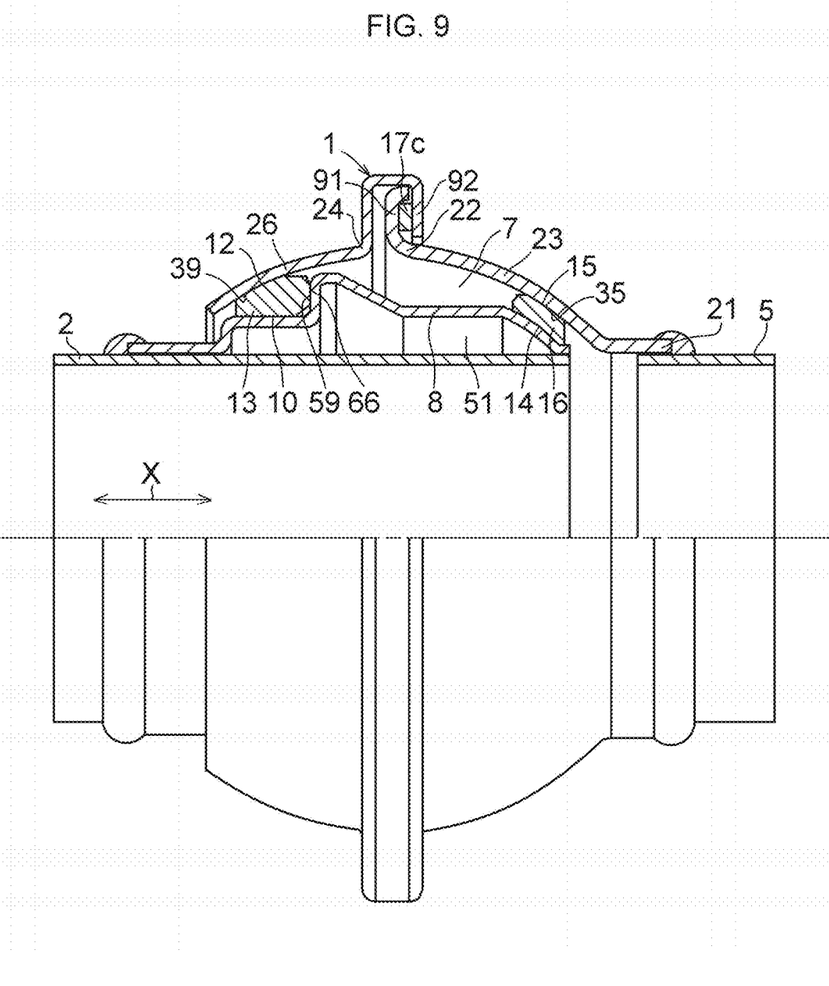
FIG. 9 is an explanatory partial vertical cross-sectional view of a still further embodiment of the invention.

Although the spherical exhaust pipe joint 1 is configured as mainly shown in FIGS. 1 to 3, the spherical exhaust pipe joint 1 may alternatively be configured as shown in FIG. 9, for example. In the spherical exhaust pipe joint 1 shown in FIG. 9, the configuration is identical to that of the spherical exhaust pipe joint 1 shown in FIGS. 1 to 3, excluding the configuration described below. Namely, the wave spring 17 is removed from between the seal body 13 and the inner case 8; an annular collar portion 91 is formed at the end portion 22 of the outer case 23; an annular collar portion 92, which is located closer to the end portion 21 side of the outer case 23 in the X direction than to the collar portion 91, is formed at the end portion 24 of the outer case 26; and a wave spring 17c is interposed between the collar portions 91 and 92. According to such a spherical exhaust pipe joint 1 shown in FIG. 9, since the wave spring 17c can be moved radially away from the upstream-side exhaust pipe 2 and the downstream-side exhaust pipe 5 serving as heat sources, it is possible to obtain the resilient property of the wave spring 17c which is difficult to be affected by the temperature change of the heat sources.

DESCRIPTION OF REFERENCE NUMERALS AND SIGNS

1: spherical exhaust pipe joint
2: upstream-side exhaust pipe
3, 4: pipe end portion
5: downstream-side exhaust pipe
6: outer case
8: inner case
13, 13a, 13b, 16, 16a: seal body
17, 17c: wave spring

The invention claimed is:

1. A spherical exhaust pipe joint comprising:
an outer case which is secured to a pipe end portion of one of an upstream-side exhaust pipe and a downstream-side exhaust pipe having a pipe end portion disposed in such a manner as to oppose a pipe end portion of the upstream-side exhaust pipe;
an inner case which is secured to a pipe end portion of another one of the upstream-side exhaust pipe and the downstream-side exhaust pipe, and which faces said outer case with a clearance therebetween in a radial direction;
an annular first seal body which is disposed in the clearance on an upstream side and has an outer peripheral surface facing an inner peripheral surface of said outer case and an inner peripheral surface opposing that outer peripheral surface and facing an outer peripheral surface of said inner case;
an annular second seal body which is disposed in the clearance on a downstream side of said first seal body and has an outer peripheral surface facing the inner peripheral surface of said outer case and an inner peripheral surface opposing that outer peripheral surface and facing the outer peripheral surface of said inner case; and
a resiliently urging member which is disposed between said outer case and said inner case and resiliently urges said first seal body and said second seal body in an axial direction toward one of said outer case and said inner case,
wherein in a case where the outer peripheral surface of said first seal body is shaped in a form of a convex spherical shape, a concave spherical seal seat facing a convex spherical outer peripheral surface of said first seal body is formed on the inner peripheral surface of said outer case, and in a case where the inner peripheral surface of said first seal body is shaped in a form of a concave spherical shape, a convex spherical seal seat facing a concave spherical inner peripheral surface of said first seal body is formed on the outer peripheral surface of said inner case, whereas in a case where the outer peripheral surface of said second seal body is shaped in a form of a convex spherical shape, a concave spherical seal seat facing a convex spherical outer peripheral surface of said second seal body is formed on the inner peripheral surface of said outer case, and in a case where the inner peripheral surface of said second seal body is shaped in a form of a concave spherical shape, a convex spherical seal seat facing a concave spherical inner peripheral surface of said second seal body is formed on the outer peripheral surface of said inner case.

2. The spherical exhaust pipe joint according to claim 1, wherein said resiliently urging member is constituted by an annular wave spring.

3. The spherical exhaust pipe joint according to claim 1, wherein respective spherical centers of the convex spherical outer peripheral surface or the concave spherical inner peripheral surface of said first seal body and the convex spherical outer peripheral surface or the concave spherical inner peripheral surface of said second seal body are identical or different.

4. The spherical exhaust pipe joint according to claim 1, wherein said resiliently urging member is interposed between said first seal body and said inner case in the axial direction to resiliently urge said first seal body in the axial direction toward said outer case.

5. The spherical exhaust pipe joint according to claim 1, wherein said resiliently urging member is interposed between said second seal body and said inner case in the axial direction to resiliently urge said second seal body in the axial direction toward said outer case.

6. The spherical exhaust pipe joint according to claim 1, wherein said resiliently urging member is interposed between said first seal body and said outer case in the axial direction to resiliently urge said first seal body in the axial direction toward said inner case.

7. The spherical exhaust pipe joint according to claim 1, wherein said resiliently urging member is interposed between said second seal body and said outer case in the axial direction to resiliently urge said second seal body in the axial direction toward said inner case.

8. The spherical exhaust pipe joint according to claim 1, wherein said outer case includes a first outer case secured at one axial end thereof to the pipe end portion of said one exhaust pipe and a second outer case which is connected at one axial end thereof to another axial end of said first outer case and whose axial other end is disposed with a radial clearance with respect to said inner case or the other exhaust pipe.

9. The spherical exhaust pipe joint according to claim 8, wherein threadedly engaging portions which are threadedly engaged with each other are respectively formed on one of the outer peripheral surface or the inner peripheral surface of the other end of said first outer case and the inner peripheral surface and the outer peripheral surface of the one end of said second outer case.

10. The spherical exhaust pipe joint according to claim 8, wherein the other end of said first outer case and the one end of said second outer case are welded together.

11. The spherical exhaust pipe joint according to claim 8, wherein the other end of said first outer case and the one end of said second outer case are connected together by a bolt and a nut.

12. The spherical exhaust pipe joint according to claim 8, wherein an annular collar portion is formed at the other end of said first outer case, an annular collar portion which is located closer to a one end side of said first outer case in the axial direction than to the collar portion of said first outer case is formed at the one end of said second outer case, said resiliently urging member is interposed between the collar portion of said first outer case and the collar portion of said second outer case.

13. The spherical exhaust pipe joint according to claim 1, wherein a heat-insulating clearance is formed between said inner case and the other exhaust pipe with said inner case secured thereto.

14. The spherical exhaust pipe joint according to claim 1, wherein a heat insulating material is interposed in the radial direction between said inner case and the other exhaust pipe with said inner case secured thereto.

15. The spherical exhaust pipe joint according to claim 1, wherein said first seal body and said second seal body are bilaterally symmetrical about a line perpendicular to the axial direction.

16. The spherical exhaust pipe joint according to claim 1, wherein the outer peripheral surfaces of said first seal body and said second seal body are shaped in the form of the convex spherical shape, the concave spherical seal seats respectively facing the respective convex spherical outer peripheral surfaces of said first seal body and said second seal body are formed on the inner peripheral surface of said outer case, and the concave spherical seal seat facing the convex spherical outer peripheral surface of said first seal body and the concave spherical seal seat facing the convex spherical outer peripheral surface of said second seal body are bilaterally symmetrical about a line perpendicular to the axial direction.

17. The spherical exhaust pipe joint according to claim 1, wherein the outer peripheral surface of at least one of said first seal body and said second seal body is shaped in the form of the convex spherical shape, the concave spherical seal seat facing the convex spherical outer peripheral surface of the at least one of said first seal body and said second seal body is formed on the inner peripheral surface of said outer case, and the convex spherical outer peripheral surface of the at least one of said first seal body and said second seal body is formed such that a radius of curvature thereof becomes smaller than the radius of curvature of that concave spherical seal seat.

18. The spherical exhaust pipe joint according to claim 16, wherein the convex spherical outer peripheral surfaces of said first seal body and said second seal body are exposed surfaces of a lubricating sliding layer containing a solid lubricant.

19. The spherical exhaust pipe joint according to claim 1, wherein the inner peripheral surfaces of said first seal body and said second seal body are shaped in the form of the concave spherical shape, the convex spherical seal seats respectively facing the respective concave spherical inner peripheral surfaces of said first seal body and said second seal body are formed on the outer peripheral surface of said inner case, and the convex spherical seal seat facing the concave spherical inner peripheral surface of said first seal body and the convex spherical seal seat facing the concave spherical inner peripheral surface of said second seal body are bilaterally symmetrical about a line perpendicular to the axial direction.

20. The spherical exhaust pipe joint according to claim 1, wherein the inner peripheral surface of at least one of said first seal body and said second seal body is shaped in the form of the concave spherical shape, the convex spherical seal seat facing the concave spherical inner peripheral surface of the at least one of said first seal body and said second seal body is formed on the outer peripheral surface of said inner case, and the concave spherical inner peripheral surface of the at least one of said first seal body and said second seal body is formed such that a radius of curvature thereof becomes greater than the radius of curvature of that convex spherical seal seat.

21. The spherical exhaust pipe joint according to claim 19, wherein the concave spherical inner peripheral surfaces of said first seal body and said second seal body are exposed surfaces of a lubricating sliding layer containing a solid lubricant.

22. The spherical exhaust pipe joint according to claim 1, wherein said first seal body and said second seal body are formed by the compression molding of a heat insulating material and a reinforcing member made from a metal wire net formed from a fine metal wire, such that the heat insulating material is disposed in gaps of the reinforcing member made from the metal wire net.

23. The spherical exhaust pipe joint according to claim 22, wherein the heat insulating material comprises at least one of expanded graphite, mica, and asbestos.

\* \* \* \* \*